H. S. WIKEL AND M. F. THATCHER.
APPARATUS FOR PREPARING STOCK FOOD.
APPLICATION FILED SEPT. 25, 1920.
1,420,008. Patented June 20, 1922.
4 SHEETS—SHEET 1.
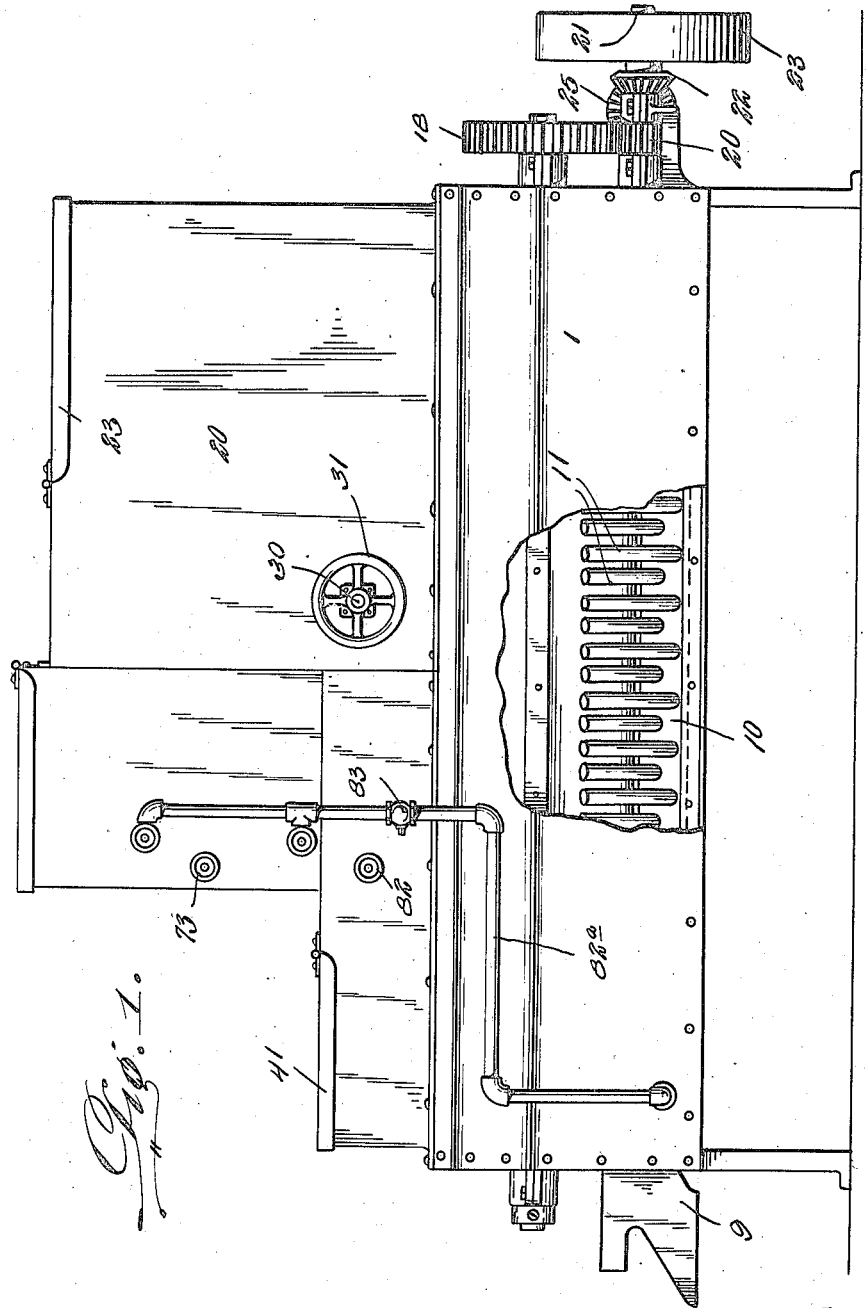

H. S. WIKEL AND M. F. THATCHER.
APPARATUS FOR PREPARING STOCK FOOD.
APPLICATION FILED SEPT. 25, 1920.
1,420,008.
Patented June 20, 1922.
4 SHEETS—SHEET 2.
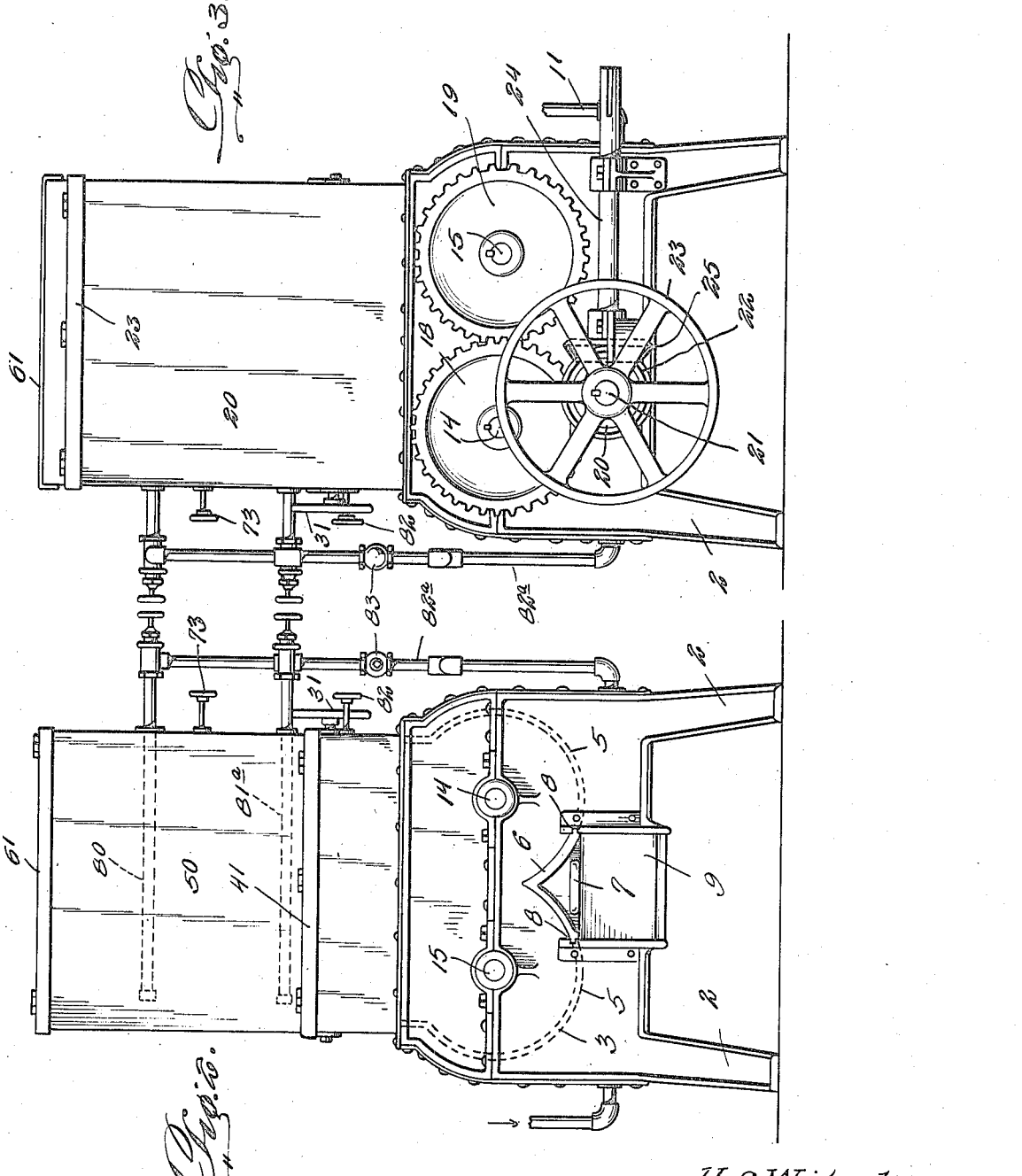

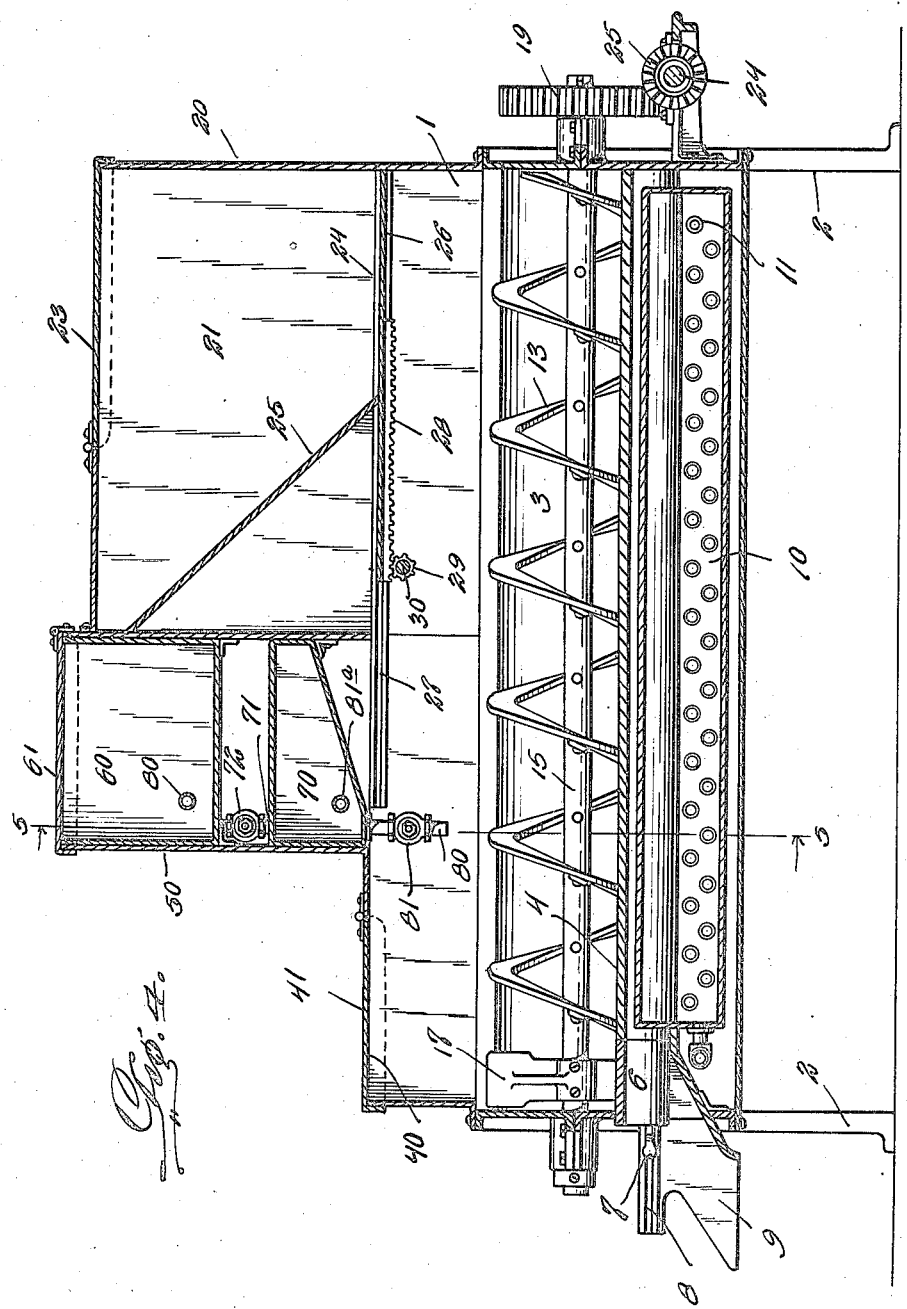

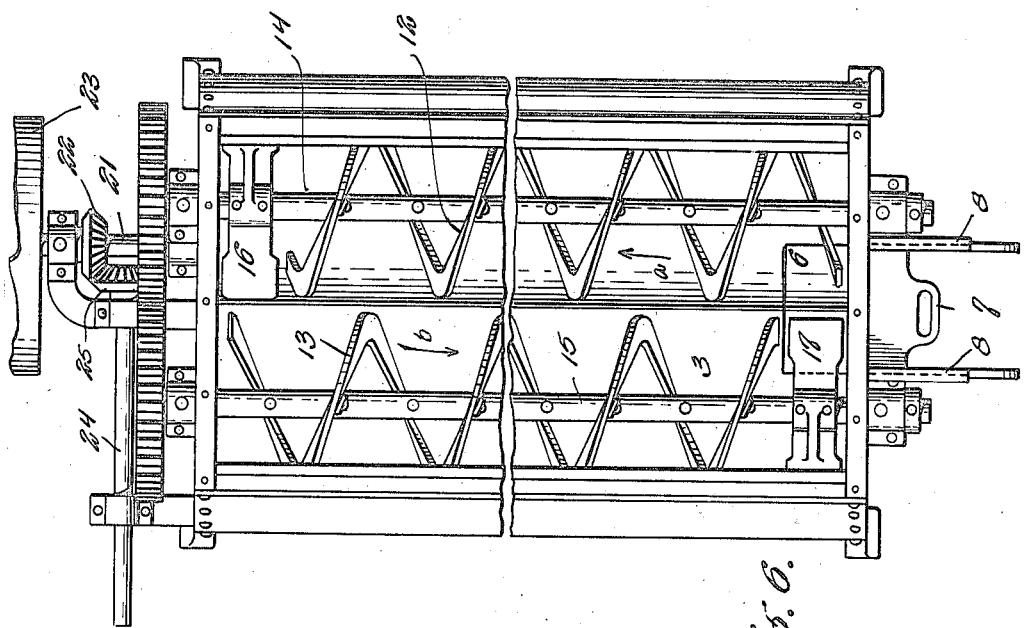

UNITED STATES PATENT OFFICE.

HENRY S. WIKEL AND MARTIN F. THATCHER, OF YORK, PENNSYLVANIA.

APPARATUS FOR PREPARING STOCK FOOD.

1,420,008.   Specification of Letters Patent.   Patented June 20, 1922.

Application filed September 25, 1920. Serial No. 412,691.

*To all whom it may concern:*

Be it known that HENRY S. WIKEL and MARTIN F. THATCHER, citizens of the United States, residing at York, in the county of York and State of Pennsylvania, have invented new and useful Improvements in Apparatus for Preparing Stock Food, of which the following is a specification.

One object of our present invention is the provision of an apparatus for expeditiously and efficiently mixing molasses and comminuted vegetable substance with a view to forming a nutritive and otherwise valuable stock-feed.

Specifically the present invention is designed to mix the product of the grinding and cutting machine constituting the subject of our contemporary application, filed Sept. 25, 1920, Serial No. 412,690, with molasses.

To the attainment of the foregoing the invention consists in the improvement as hereinafter described and definitely claimed.

In the accompanying drawings, hereby made a part hereof:—

Figure 1 is a side elevation, partly broken away, of our novel apparatus.

Figures 2 and 3 are elevations of the ends thereof.

Figure 4 is a longitudinal vertical section of the apparatus.

Figure 5 is a transverse section of the apparatus taken in the plane indicated by the line 5—5 of Figure 4.

Figure 6 is a plan view showing the mixing chamber of the apparatus and the working parts therein.

Similar numerals of reference designate corresponding parts in all of the views of the drawings.

Among other elements our novel apparatus comprises a casing 1, supported on legs 2 or otherwise.

Arranged in the casing 1 is the shell 3 of a mixing chamber, the bottom of the said shell being shaped as shown so as to form a longitudinal central raised portion 4 and sub-chambers 5 of arcuate form in cross section at opposite sides of the said raised portion 4. In effect the raised portion 4 serves as partition between the said sub-chambers 5. At one end of the apparatus the raised portion 4 is designed to abut against a slidable gate 6 having a handle 7. The said gate 6 corresponds in cross sectional shape to the raised portion 4 of the shell 3 and is movable rectilinearly in guideways 8. It will also be observed that the gate 6 is disposed above a discharge spout 9 so that when the gate is moved outwardly or toward the left from the position shown in Figure 4 the contents of the shell 3 will be free to pass to the spout 9 and from said spout into a receptacle arranged to receive the contents.

Arranged under and adjacent to the longitudinal central portion of the shell 3 and within the casing 1 is a manifold 10, designed to be connected at $11^x$, Figure 2, with a suitable source of steam supply. The upper part of the manifold 10 is shaped in conformity to the inner portion of the shell 3, and said manifold is provided at its opposite sides with lateral hollow arcuate arms 11; the said arms being closed at their outer ends and in communication with the interior of the manifold at their inner ends, whereby when steam is let into the manifold, the shell 3 will be uniformly heated throughout its lower portion.

Arranged to turn in the sub-chambers 5 in the mixing chamber are longitudinal, rotatable mixers and conveyors 12 and 13. The said mixers and conveyors are carried by longitudinal shafts 14 and 15, and the shaft 14 is provided adjacent to one end of the mixing chamber with a paddle 16, while the shaft 15 is provided adjacent to the opposite end of the mixing chamber with a similar paddle 17. Fixed on the said shafts 14 and 15 are intermeshed spur gears 18 and 19, and intermeshed with the spur gear 18 is a spur gear 20 on a shaft 21. The said shaft 21 is provided with a miter gear 22 and with a band pulley 23, the latter being by preference removable from the shaft. We prefer to employ in conjunction with the shaft 21 equipped as described an auxiliary shaft 24, disposed at right angles to the shaft 21 and having a miter gear 25 intermeshed with the miter gear 22. Manifestly when it is more convenient for connection with a source of power the pulley 23 may be removed from the shaft 21 and may be mounted on the shaft 24.

When substances to be mixed are received in the mixing chamber and the mixers are rotated it will be understood that the mixer and conveyor 12 will move the substances longitudinally on one sub-chamber 5 in the direction of the large arrow $a$ in Figure 6. When the substances reach the paddle 16 the said paddle will operate to transfer the substances to the other sub-chamber 5 whereupon the combined agitator and conveyor 13 will operate to move the substances longitudinally in the direction indicated by the large arrow *b* in Figure 6. Then when the substances reach the paddle 17 the said paddle 17 will operate to transfer the substances from the last-named sub-chamber 5 to the first-named sub-chamber 5. This operation is of course maintained until a thorough commingling of the substances in the presence of heat is brought about. We would also have it understood at this point that when the gate 6 is opened, the paddle 17 will operate to accelerate the discharge of the substances to the spout 9.

Arranged upon and connected to the casing 1 as shown or formed integral with the said casing 1 is an upper casing portion 20 in which is a chamber 21 to receive comminuted vegetable substance to form stock-feed. The said chamber 21 is provided with a filling opening 22ˣ controlled by a door 23 and is also provided with a discharge opening 24 and an inclined wall or chute 25 that extends downwardly to one side of the opening 24. The opening 24 is controlled by a slidable gate 26, the said gate 26 being movable horizontally in guideways 27 and being provided upon its underside with longitudinal racks 28. Intermeshed with the said racks 28 are spur gears 29 on a transverse shaft 30 that is provided outside of the casing portion 20 with a hand wheel 31. Manifestly when the hand wheel 31 is turned in the proper direction the gate 26 will be moved toward the left in Figure 4 to permit substance to drop through the opening 24, and when the hand wheel is turned in the opposite direction the gate 26 will be returned to its closed position.

At a point above the gate 6 the casing portion 20 is provided with an opening 40, normally closed by a door 41. The said opening 40 is provided in order that an attendant may look down upon and ascertain the state of the mixture at a point above the gate 6.

Arranged in a casing portion 50, located between the door 41 and the inner end of the casing portion 20, is a receptacle 60 for molasses or the like, the said receptacle being controlled by a hinged door 61. Also arranged in the casing portion 50 and below and spaced from the receptacle 60 is a measuring vessel 70. The receptacle 60 and the measuring vessel 70 are connected by an interposed conduit 71, Figure 5, in which is a valve 72, designed to be controlled through the medium of the handle 73 outside of the casing. The measuring vessel as its name imports is designed to enable an operator to supply a predetermined quantity of molasses to the vegetable substance previously let into the mixing chamber. From the measuring vessel 70 molasses is designed to pass through a discharge pipe 80 in which is a valve 81 having a handle 82 outside of the casing.

In order to increase the fluidity of the molasses it is desirable to inject steam into the receptacle 60 and the measuring vessel 70. We therefore provide the transverse steam pipes 80 and 81ᵃ having minute apertures at intervals in their lengths through which steam is supplied to the molasses. The said pipes 80 and 81ᵃ are connected through the medium of a pipe 82ᵃ with the manifold 10, and in order to prevent molasses passing through the said manifold the pipe 82ᵃ is provided with a non-return valve 83 arranged to open in a direction away from the manifold 10.

It will be apparent from the foregoing that the molasses will be heated anterior to the mixture of the same with the vegetable substance in the mixing chamber; also, that the vegetable substance and the molasses will be heated incident to the commingling thereof with the result that the molasses will be expeditiously and adequately taken up by the vegetable substance all of which will have absorbing capacity.

From this it follows that through the medium of our novel apparatus a highly palatable and nutritious stock-food may be quickly, easily and economically produced. We would also have it understood that the comminuted vegetable portion of the food may be produced from all of the appropriate materials that grow on a farm which conduces materially to the cheapness of the food. We would further have it understood that the fertilizer into which the stock-food will be ultimately converted is highly valuable.

Having described our invention, what we claim and desire to secure by Letters-Patent, is:—

1. A mixing apparatus comprising a mixing chamber having a longitudinal central partition, longitudinal rotary agitators and conveyors disposed in the sub-chambers at opposite sides of the partition, a paddle rotatable with one agitator and conveyor adjacent to one end of the chamber, and a paddle rotatable with the other agitator and conveyor adjacent to the opposite end of the conveyor.

2. A mixing apparatus comprising a mixing chamber having a longitudinal central partition, longitudinal rotary agitators and conveyors disposed in the sub-chambers at opposite sides of the partition, a paddle rotatable with one agitator and conveyor adjacent to one end of the chamber, and a paddle rotatable with the other agitator and conveyor adjacent to the opposite end of the conveyor, in combination with a gate at one end of the chamber and conforming in shape to the longitudinal central partition and normally forming part thereof and arranged in transverse coincidence with one of the paddles.

3. A mixing apparatus comprising a mixing chamber having a longitudinal central partition, longitudinal rotary agitators and conveyors disposed in the sub-chambers at opposite sides of the partition, a paddle rotatable with one agitator and conveyor adjacent to one end of the chamber, and a paddle rotatable with the other agitator and conveyor adjacent to the opposite end of the conveyor, in combination with a gate at one end of the chamber and conforming in shape to the longitudinal central partition and normally forming part thereof and arranged in transverse coincidence with one of the paddles, the said gate being slidable in longitudinal guideways and being disposed above a discharge spout.

4. A mixing apparatus comprising a mixing chamber having a longitudinal central partition and sub-chambers at opposite sides of said partition, rotary agitating devices in said sub-chamber, a manifold adapted to be connected with a source of steam supply and arranged under and in close proximity to the longitudinal central portion of the mixing chamber, and steam containing arms communicating with and reaching laterally outward from opposite sides of the manifold and arranged in close proximity to the sub-chambers to uniformly head the bottoms thereof.

5. A mixing apparatus comprising a mixing chamber having a longitudinal central partition and sub-chambers at opposite sides of said partition, rotary agitating devices in said sub-chamber, a manifold adapted to be connected with a source of steam supply and arranged under and in close proximity to the longitudinal central portion of the mixing chamber, and steam containing arms reaching from opposite sides of the manifold and arranged in close proximity to the sub-chambers, in combination with means above the mixing chamber to receive and contain the vegetable substance, means controlling communication between said receiver and container and the mixing chamber, means above the mixing chamber to receive and contain molasses, means controlling communication between the molasses containing means and the mixing chamber, and means connected with the manifold to supply steam to the molasses in said containing means.

6. A stock-food preparing apparatus comprising a mixing chamber, mixing means therein, a steam container and heater under the mixing chamber, a molasses container above the mixing chamber, means to control communication between the molasses container and the mixing chamber, and a valved conduit between the steam heating means below the mixing chamber and the molasses container and extending into the molasses container and having minute apertures for the direct discharge of steam into the molasses.

In testimony whereof we affix our signatures.

HENRY S. WIKEL.
MARTIN F. THATCHER.